Jan. 9, 1923.
A. H. CONNORS.
BUOYANT ORE SEPARATOR.
ORIGINAL FILED JAN. 15, 1920.
1,441,560.
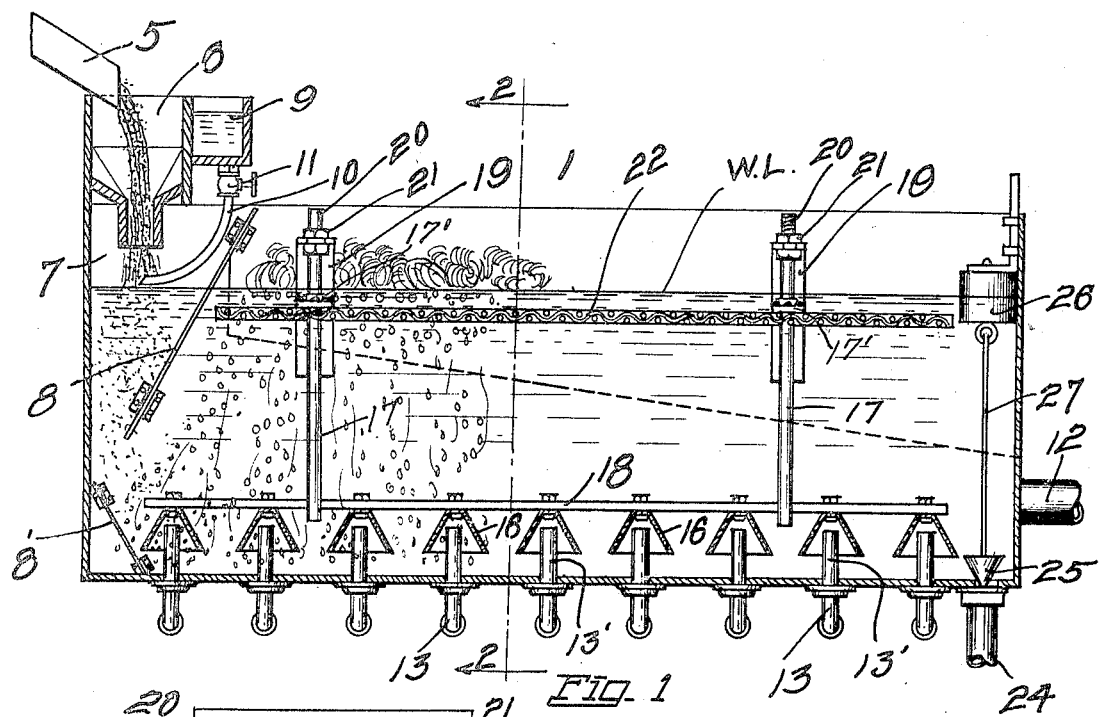
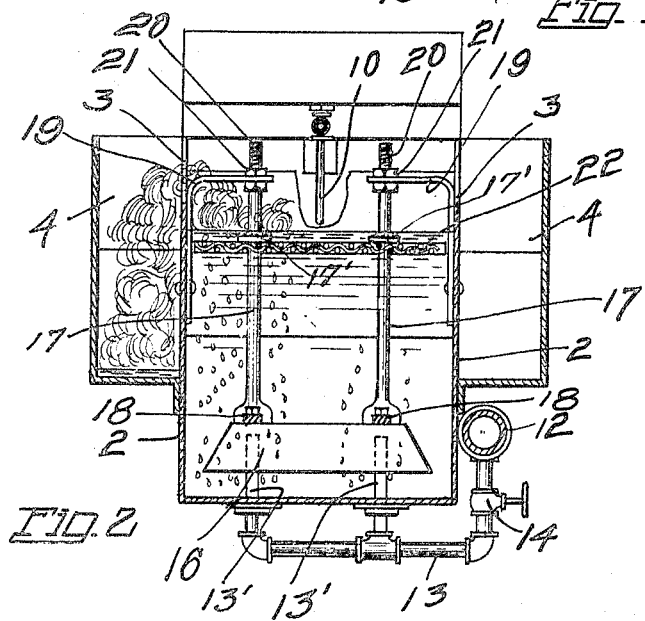
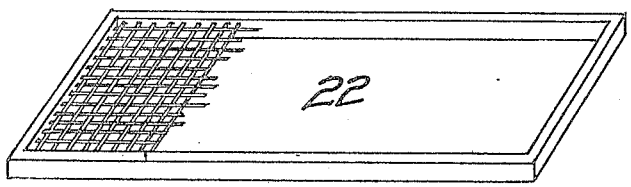
Inventor
Arthur H. Connors.
By
Attorney Patented Jan. 9, 1923.

1,441,560

UNITED STATES PATENT OFFICE.

ARTHUR H. CONNORS, OF MULLAN, IDAHO.

BUOYANT ORE SEPARATOR.

Original application filed January 15, 1920, Serial No. 351,644. Divided and this application filed September 1, 1921. Serial No. 497,687.

*To all whom it may concern:*

Be it known that I, ARTHUR H. CONNORS, a citizen of the United States, residing at Mullan, in the county of Shoshone and State of Idaho, have invented certain new and useful Improvements in Buoyant Ore Separators, of which the following is a specification.

My present invention relates to improvements in buoyant ore separators of that type involving the flotation process of washing ores, by means of which the oiled concentrates or minerals are separated from the gangue or pulp, and utilized in connection with aerating means for the gangue or pulp for assisting in conveying the mineral particles to the surface of the pulp.

In the customary manner of ore separation by the flotation process, oil is added to the gangue or material before the latter is fed to the separating cell, and consequently when the oiled mass encounters the water surface a rebounding action or splash takes place as the oil and ore are fed to the cell, in consequence of which the oil spreads in a film or layers over the surface of the water. This film of oil thus produced on the surface of the water is either wasted by being carried off by bubbles in waves on the water surface, or the oil film retards the rising bubbles that carry the mineral particles. By the utilization of my invention as hereinafter described, I am enabled to commingle the oil with the pulp at a local or initial point in the cell, and prevent unnecessary spread of the oil on the surface of the water, by insuring a proper mixture of the oil with the gangue beneath the water surface. In this manner, in connection with the aerating apparatus in the cell, the bubbles are formed and rise to the surface with the mineral particles, and are then conveyed to the launders in usual manner.

In the accompanying drawings I have illustrated one complete example of the physical embodiment of my invention wherein the parts are combined and arranged according to the best mode I have thus far devised for the practical application of the principles of my invention.

Figure 1 is a longitudinal vertical sectional view of a separating cell constructed according to my invention.

Figure 2 is a transverse vertical sectional view at line 2—2 in Figure 1, part of the inclined shield being broken away to permit exposure of the oil pipe.

Figure 3 is a perspective view of a horizontal screen, longitudinally disposed in the cell beneath the water level for preventing agitation or waves on the surface of the water, and Figure 4 is a perspective view of a screen that is slightly modified in construction and may be used as a substitute for the screen in Figure 3.

In the preferred form of the invention as illustrated in the drawings I utilize a box or cell 1 of suitable material, rectangular in shape and having vertical side walls 2, 2, that are cut away at 3, 3 to form spillways into the lateral or side launders 4, 4, erected at the outer sides of the cell and of which the side walls form a part. These launders are designed to receive by flotation, the mineral particles from the separating chamber of the cell.

At the front or forward end of the cell the pulp is supplied from the pulp conducting spout 5 and deposited in the pulp receiving hopper 6 erected above the top of the cell and from which the pulp may pass to the receiving chamber 7 in the front end of the cell. The rear wall of this receiving chamber is formed by a transversely disposed deflector partition or shield 8, attached to the side walls of the cell and elevated above the bottom thereof. This deflector serves the function of eliminating splash as the pulp drops into the receiving chamber, and also directs the pulp toward the front of the receiving chamber, thus preventing its too rapid flow toward the outlet or tail end of the cell. An additional partition 8′ may be placed across the corner at the lower front end of the cell to prevent accumulation of the pulp in the corner.

The gangue or pulp is thus fed to the cell at the front end thereof and deposited in the water in the receiving chamber as indicated in Figure 1, and the oil is supplied to the pulp at the point of its entrance to the water, the screen 8 serving to prevent distribution of oil to the surface of the water, the water level in the cell being indicated at W. L.

Adjacent to the feed hopper 6, an oil tank 9 is provided from which the oil content may run by gravity through the curved outlet pipe 10 and be controlled by the regulating valve 11 in said pipe. The oil pipe is positioned to direct the flow of oil into the incoming or inflowing pulp above the water line or level of the cell, and into the path of the material, so that the weight of the material will cause the submergence of the oil with the material into the receiving chamber of the cell where the pulp is thoroughly impregnated and commingled with the oil, and then distributed with the mass of pulp or ore in the cell. The oil is introduced for the purpose of strengthening the air bubbles that are produced at the bottom of the cell and rise to the surface of the pulp in the cell, carrying with them the adhering particles of mineral, and the oil, which forms a film or coating around the bubbles also enhances the ability of the bubbles to retain and carry the mineral particles.

The aerating device located in the bottom of the cell is supplied from the main pipe 12 shown in Figure 2, and branch pipes 13 project upwardly into the cell, through the bottom thereof to form vertically extending nozzles 13', the flow of compressed air through the nozzles being controlled by valves 14. Above the nozzles are located hoods 16 of suitable material and of inverted V-shape, to "shed" the gangue or rocky material from the nozzles and to distribute the air from the nozzles. The subject matter of the aerating device illustrated forms an application for patent Ser. No. 351,644, filed Jan. 15, 1920, from which application this present case is a division.

The hoods of the aerating device are suspended from two pairs of suspending rods 17, 17, spaced symmetrically in the longitudinally extending and transversely extending axes of the cell and these suspending rods support a pair of horizontal bars 18, 18, beneath which the hoods are secured at their apices, the bars extending the length of the cell and supporting each hood near each of its ends to render the structure rigid and well braced.

The perpendicular or vertical bars or rods are supported in brackets 19 attached at the inner sides of the side walls of the cell, and the upper end of each rod is threaded as at 20 and passed through an opening in its bracket where it is secured by a lock nut 21.

To prevent slopping over of the wash caused by action of the bubbles, due to longitudinally moving wave actions from the front to the rear of the cell, I utilize a horizontally disposed screen 22 located just beneath the water level and extending from the inclined shield 8 to the rear of the cell. This screen, as in Figure 3, may be of wire mesh, or, as in Figure 4, the screen 23 may be made in the form of honey-combs. In either event the screen is supported in stationary position from the side walls of the cell or from the posts 17, just beneath the water level by flanges 17' on the posts and attached to the screen, to stabilize the pulp and water in the cell at the water level, and permit a gradual movement of the bubbles on the surface of the water toward the launders at the sides of the cell. In this manner the partitions or shield 8 which guides the gangue and to some extent prevents wave motions on the water surface, is assisted by the screen 22, and due to the presence of these two members the surface of the pulp is maintained in a comparatively quiet and smooth condition to permit the rising bubbles to float off to the launders without undue agitation and consequent loss of material. As the bubbles ascend through the screen 22, after having been formed with the oil coating thereon to which the mineral adheres, they emerge at the surface and float off to the launders as described.

The mineral products are thus carried off from the surface of the pulp, and the tailings are disposed of through the outlet pipe 24 leading from the bottom of the cell at its rear end, and the outlet opening to the pipe is controlled by a valve 25 adapted to fit therein and regulated by a float 26 on the surface of the pulp, connected to the valve plug 25 by the connecting rod 27. Thus the water line of the pulp is maintained at the desired level by the action of the float 26, which rises with an excess of pulp in the cell and opens the valved outlet, and falls as the level of the pulp falls to close the opening.

As the oil from the pipe 10 is submerged by action of the falling gangue, any surplusage of oil, or any oil that might escape the falling material is confined to the surface of the pulp in the receiving chamber 7 and thus prevented from floating to the surface of the pulp in the separating chamber for the ore. The incoming material is directed toward the front end of the cell by the shield 8, and because of the circulation of water and air in the cell, the pulp is thoroughly separated, the mineral is permitted to adhere to the oil bubbles as they rise to the surface of the pulp, and the longitudinally extending aerating device supplies the air to all parts of the cell thus insuring an effective and economical separation and flotation of the mineral particles.

Having thus fully described my invention, what I claim as new and desire to secure by Letters Patent is—

1. A froth flotation cell of the pneumatic type having a partition at one end forming a pulp receiving compartment, means for delivering pulp in a plunging stream from above the surface level in the receiving compartment, and means for delivering flotation reagent at said pulp level and directly in the path of the plunging stream.

2. A flotation cell having a froth overflow, means for delivering bubble forming gas to the cell at the lower part thereof, a foraminous screen covering the upper portion of the cell in proximity to the water level therein, and means for adjusting said screen relatively to the water level and the froth overflow.

3. A flotation cell having a froth overflow, means for delivering bubble forming gas to the cell at the lower part thereof, brackets in the cell and posts supported thereon, means for adjusting the posts in the brackets, and a horizontally disposed, foraminous screen supported on said posts covering the upper portion of the cell is proximity to the water level therein.

In testimony whereof I affix my signature.

ARTHUR H. CONNORS.